J. A. TAYLOR.
CREEPER.
APPLICATION FILED FEB. 26, 1920.
1,363,023. Patented Dec. 21, 1920.
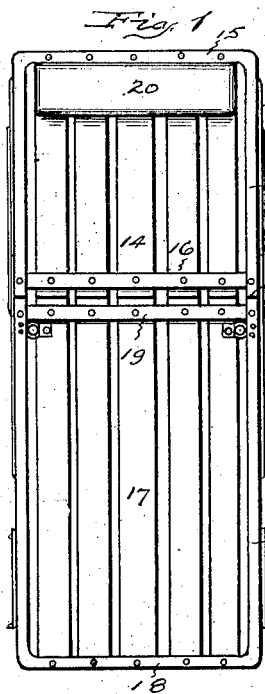
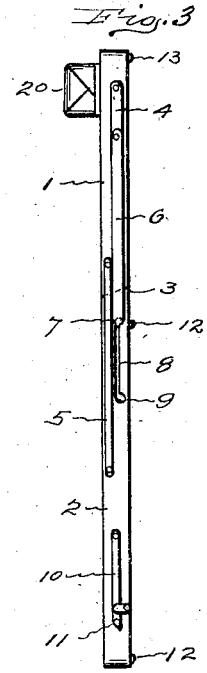
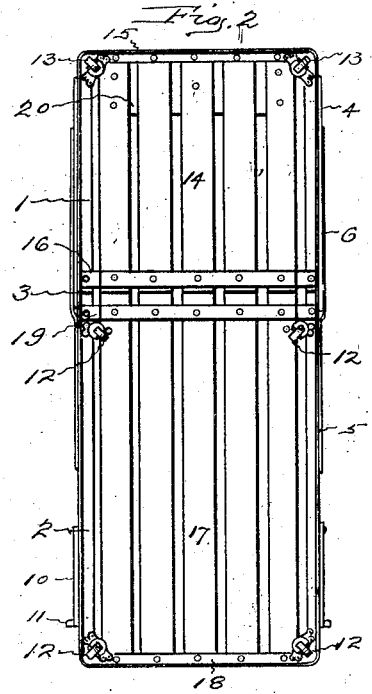
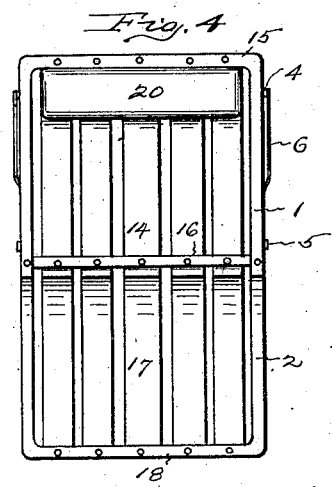
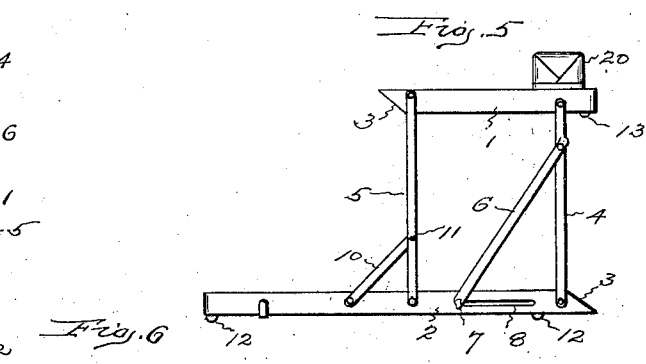
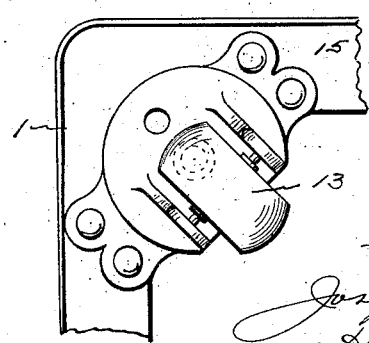
Inventor:
Joseph A Taylor
by Harry R Williams
atty.

UNITED STATES PATENT OFFICE.

JOSEPH A. TAYLOR, OF HARTFORD, CONNECTICUT, ASSIGNOR TO THE WALKER & BARKMAN MANUFACTURING COMPANY, OF HARTFORD, CONNECTICUT, A CORPORATION OF CONNECTICUT.

CREEPER.

1,363,023.   Specification of Letters Patent.   Patented Dec. 21, 1920.

Application filed February 26, 1920. Serial No. 361,505.

*To all whom it may concern:*

Be it known that I, JOSEPH A. TAYLOR, citizen of the United States, residing at Hartford, in the county of Hartford and State of Connecticut, have invented a new and useful Improvement in Creepers, of which the following is a specification.

This invention relates to those devices which are provided for the use of mechanics, chauffeurs and the like artisans when it is necessary in garages and similar places to work beneath automobiles and such vehicles for the purpose of making repairs, cleaning or adjusting parts under side.

The object of the invention is to provide a simple and inexpensive device upon which a workman may comfortably lie and easily manipulate so as to change his location or position beneath the car as is necessary while working, without employing his hands for the purpose, and which is so constructed that it may be quickly adjusted for use as a seat when the work to be done is not beneath the vehicle.

The invention is embodied in a structure which comprises a frame and platform formed in two sections which are mounted upon freely turning rollers or casters and are connected by links in such manner that the sections may be extended in one continuous plane so as to lie flatwise on the casters close to the ground or floor, or one section may be elevated above the other with a parallel motion so as to provide a seat that is raised above the section which is close to the ground and which may form a foot rest when the seat is raised.

In the accompanying drawings Figure 1 shows a plan of a device that embodies the invention with the sections in the same extended plane as when arranged for use beneath an automobile. Fig. 2 shows a bottom view of the same. Fig. 3 is a side view of the device in the extended flat position. Fig. 4 is a plan with one section raised above the other to provide a seat. Fig. 5 shows a side elevation with the seat up. Fig. 6 shows on larger scale a bottom view of one corner of the structure.

The frame of the device is oblong in outline and is preferably formed of angle iron, the head section 1 being separated from the foot section 2 by oblique cuts 3 so made that when the sections are extended flatwise in the same plane the meeting edges fit together and the frame is practically continuous. The sections of the frame shown are connected on each side by parallel links 4 and 5 that have their ends pivoted to the side rails of the frames of the respective sections. On each side is a brace 6 which has one end pivoted to the link 4 and its other end provided with a stud 7 that is fitted to slide in a slot 8 in the side rail of the frame of the foot section when the head section is moved from one position to another. The ends of these slots are enlarged so as to form locking recesses 9 designed to receive and temporarily retain the studs at the ends of the braces when the head section is raised, and on each side a brace 10 is pivoted to the side rail of the foot section of the frame, and provided with a stud 11 that is adapted to be inserted in a perforation in the link 5 when the brace is turned up, to prevent the structure from collapsing when used as a seat. Attached to the under side at the four corners of the foot section of the frame are swiveled rollers or casters 12, and attached at the two outer corners of the head section of the frame are swiveled rollers or casters 13.

The head section is provided with a flooring, preferably wooden slats 14 that are secured at one end to the frame cross rail 15 and at the other end to the bar 16 that extends crosswise between the side rails of the head section of the frame. The foot section is provided with a flooring, preferably wooden slats 17 that are secured at one end to the frame cross rail 18 and at the other end to the bar 19 that extends crosswise between the side rails and the foot section of the frame. The meeting ends of the slats of the respective frame sections are desirably so shaped that when the sections are in the same plane they fit together and form a smooth continuous surface. A padded head rest 20 is desirably fastened upon the upper surface of the head section.

When this structure is extended into its flat condition a mechanic may lie with his back upon it and his head on the head rest. In this position the mechanic may by his feet easily push himself beneath an automobile and readily change his location as may be required by the work to be performed. If the work to be done is not beneath the car the head section may be swung up to provide a raised seat. Owing to the parallel bar action between the sections the head section always remains horizontal and when it is up it is firmly held by the braces until the braces are released.

The invention claimed is:—

1. A creeper comprising a frame formed in two sections, two links on each side joining the side of one frame section with the side of the other frame section, whereby the frames may be extended into the same plane or one section raised over the other section and parallel therewith, means for holding the raised section in elevated position, and rolling supports on the under side of each section.

2. A creeper comprising a frame formed of a head section and a foot section, parallel links on each side joining the head section and the foot section, whereby the sections may be extended into the same plane to permit a person to stretch at full length on the creeper or the head section may be raised parallel over the foot section to permit the head section to be used as a seat, means for holding the head section elevated over the foot section, and rolling supports on the under side of each section.

3. A creeper comprising a sectional frame, parallel links connecting the sides of one frame section with the sides of the other frame section, whereby the sections may be extended in a single plane or one section raised above and parallel with the other section, rolling supports secured to the under side of both frame sections, and a separate flooring carried by each frame section.

4. A creeper comprising a sectional frame, parallel links joining the frame sections whereby the sections may be extended in a single plane or one section raised above the other section, swiveled rollers secured beneath the frame sections, slats secured to the frame sections, and a head rest fastened to one of the sections.

5. A creeper comprising a sectional frame, parallel links on each side with one end of each link fastened to the head section and the other end of each link fastened to the foot section whereby the sections may be extended in a single plane or one section raised above the other section, a brace on each side pivoted to one link and slidably connected with the side rail of the foot section, swiveled rollers secured beneath the frame sections, and a flooring carried by each frame section.

JOSEPH A. TAYLOR.